(12) United States Patent
Garber (10) Patent No.: US 9,499,285 B2
(45) Date of Patent: Nov. 22, 2016

(54) THREE DIMENSIONAL IMAGING ARRANGEMENT

(71) Applicant: Darren D. Garber, Rancho Palos Verdes, CA (US)

(72) Inventor: Darren D. Garber, Rancho Palos Verdes, CA (US)

(*) Notice: Subject to any disclaimer, the term of this patent is extended or adjusted under 35 U.S.C. 154(b) by 257 days.

(21) Appl. No.: 14/120,788

(22) Filed: Jun. 27, 2014

(65) Prior Publication Data

US 2015/0375876 A1    Dec. 31, 2015

Related U.S. Application Data

(60) Provisional application No. 61/957,310, filed on Jun. 28, 2013.

(51) Int. Cl.

| | |
|---|---|
| *B64G 1/66* | (2006.01) |
| *B64G 1/10* | (2006.01) |
| *B64G 1/22* | (2006.01) |
| *B64G 1/26* | (2006.01) |
| *B64G 1/36* | (2006.01) |
| *B64G 1/64* | (2006.01) |
| *B64G 3/00* | (2006.01) |
| *B64G 1/24* | (2006.01) |

(52) U.S. Cl.
CPC . *B64G 1/66* (2013.01); *B64G 1/10* (2013.01); *B64G 1/1085* (2013.01); *B64G 1/36* (2013.01); *B64G 1/64* (2013.01); *B64G 3/00* (2013.01); *B64G 1/222* (2013.01); *B64G 1/242* (2013.01); *B64G 1/26* (2013.01); *B64G 1/361* (2013.01); *B64G 1/648* (2013.01)

(58) Field of Classification Search
CPC .............. B64G 1/1085; B64G 1/66; B64G 2001/1028; B64G 2001/1035
USPC ............. 348/42–60, 135, 139, 144–147
See application file for complete search history.

(56) References Cited

U.S. PATENT DOCUMENTS

| | | | | |
|---|---|---|---|---|
| 4,843,397 A | * | 6/1989 | Galati | B64G 1/1021 342/354 |
| 6,002,360 A | * | 12/1999 | Wolcott | H04B 7/18576 342/354 |
| 8,193,968 B1 | * | 6/2012 | Kia | B64G 3/00 342/118 |
| 2007/0045474 A1 | * | 3/2007 | Bae | B64G 1/1085 244/171.1 |
| 2009/0256909 A1 | * | 10/2009 | Nixon | B64D 47/08 348/144 |
| 2010/0013927 A1 | * | 1/2010 | Nixon | G01C 11/06 348/144 |
| 2010/0053304 A1 | * | 3/2010 | Underkoffler | G06F 3/017 348/42 |
| 2010/0309313 A1 | * | 12/2010 | Antikidis | B64G 1/1021 348/144 |
| 2012/0097797 A1 | * | 4/2012 | Woo | B64G 1/242 244/158.6 |
| 2013/0135443 A1 | * | 5/2013 | Martinerie | H04N 13/02 348/47 |
| 2013/0250104 A1 | * | 9/2013 | Williams | G06T 3/4061 348/144 |
| 2014/0107865 A1 | * | 4/2014 | Griffith, Sr. | G05D 1/00 701/2 |
| 2015/0078620 A1 | * | 3/2015 | Ledergerber | B64B 1/32 382/103 |

* cited by examiner

*Primary Examiner* — Justin Rephann (57) ABSTRACT

A spacecraft arrangement having sensors for providing the three dimensional imaging of space object to be imaged and having a plurality of spaced apart nodes defining an open imaging area therebetween through which imaging area the space object to be imaged passes.

15 Claims, 7 Drawing Sheets

| # | MET (DAYS) | TIME TO NEXT NEO (DAYS) | NEO NAME | DELTA V (M/S) |
|---|---|---|---|---|
| 1 | 0.0 | 0.0 | (2003 QC10) | 96.0 |
| 2 | 38.6 | 38.6 | (2003 TL4) | 137.6 |
| 3 | 89.4 | 50.8 | (1998 XN17) | 66.1 |
| 4 | 138.9 | 49.5 | (2008 CQ) | 6.4 |
| 5 | 255.9 | 117.0 | (2005 WB1) | 61.6 |
| 6 | 328.0 | 72.2 | (2006 BX7) | 97.7 |
| 7 | 394.5 | 66.5 | (1998 ST27) | 62.5 |
| 8 | 454.1 | 59.5 | (2011 EM51) | 125.7 |
| 9 | 526.9 | 72.8 | 275976 (2001 XV10) | 70.6 |
| 10 | 651.8 | 124.9 | (2011 EX4) | 143.7 |
| 11 | 747.8 | 96.0 | 303450 (2005 BY2) | 133.8 |
| 12 | 809.3 | 61.5 | (1994 CB) | 44.5 |
| 13 | 866.3 | 57.0 | (2009 SH2) | 70.8 |
| 14 | 891.8 | 25.5 | (2009 TJ) | 136.8 |
| 15 | 980.6 | 88.8 | (2012 BF86) | 72.8 |
| 16 | 1100.6 | 120.0 | (2012 HZ33) | 14.7 |
| 17 | 1173.8 | 73.2 | (2002 NW16) | 115.5 |
| 18 | 1236.4 | 62.6 | (2010 TF54) | 106.4 |
| 19 | 1275.0 | 38.5 | (2008 VR4) | 100.1 |
| 20 | 1324.3 | 49.4 | (2010 PS66) | 0.3 |
| 21 | 1333.7 | 9.3 | (2010 QE2) | 67.8 |
| 22 | 1409.2 | 75.5 | (2002 XS14) | 72.7 |
| 23 | 1550.1 | 140.9 | (2012 GC2) | 137.2 |
| 24 | 1638.3 | 88.3 | (2004 MO4) | |

THREE DIMENSIONAL IMAGING ARRANGEMENT

BACKGROUND OF THE INVENTION

Field of the Invention

This invention relates to the imaging art and more particularly to the three dimensional ("3D") tomographic multimode imaging of natural and artificial space objects such as resident space objects ("RSO") in orbit about the earth to include debris and active satellites and other space objects such as near earth objects ("NEO") to include asteroids, inert cometary nuclei and even larger space objects about other planets such as Mars' moons, and the like in a single flyby of such object.

Description of the Prior Art

Providing an image of an object in space has heretofore often been accomplished by a single space vehicle making multiple passes around the space object to be imaged. In such applications, the space vehicle was required to make one or more orbits around the object, varying the orbits relative the space object to obtain views of as many different parts of the space object desired. Such multiple orbits required large changes in the velocity of the space craft and consequently large use of the propulsive consmables, such as liquid fuel, compressed gas or the like, to effect such changes in velocity. The extensive use of the propulsive fluid limited the mission time and capability of the space vehicle.

In other prior space object mapping missions, multiple space vehicles were utilized to pass over different portions of the space object and, as such, the costs and expenses associated with multiple space vehicle mapping missions were multiplied for such space object imaging missions.

Accordingly, it is an object of the present invention to provide a system for 3D imaging of objects in space in a single flyby of such objects.

It is another object of the present invention to provide an economical method for the 3D imaging of a space object.

It is yet another object of the present invention to provide a space vehicle arrangement for the mission of 3D imaging of a space object in which the space vehicle arrangement moves relative to the space object to be imaged or the space vehicle arrangement awaits the passage of the space object.

It is another object of the present invention to provide a spacecraft arrangement for imaging a space object to be imaged in which the spacecraft arrangement is comprises of a plurality of component nodes defining an imaging area therebetween and the space object to be imaged passes through the imaging area.

It is another object of the present invention to provide a spacecraft arrangement for imaging a space object to be imaged in which images of the space object to be imaged are synchronously obtained by a plurality of nodes of the spacecraft arrangement.

SUMMARY OF THE INVENTION

The above and other objects of the present invention are achieved, in a preferred embodiment thereof by providing a space vehicle arrangement for the imaging of a space object in which the space vehicle arrangement is a ring-like array of a plurality of interconnected, spaced apart nodes defining an open, imaging area therebetween The ring-like array of the nodes is preferably aligned in a planar array, though other embodiments of the invention may utilize a non-planar array of the plurality of nodes. The nodes may be connected together by flexible tethers or booms and the distance between adjacent nodes may be from, for example, a few meters to tens of kilometers depending on the size of the space object to be imaged. The number nodes employed may be, for example, any number required to encompass the selected target object as desired for particular applications. The ring-like array of nodes may be rotating about an axis such as an axis perpendicular to the plane of the ring-like array of the nodes and, for example, parallel to and co-linear with the relative paths of movement of the space vehicle arrangement and the space object to be imaged.

For the embodiments of the present invention wherein the ring-like array of the nodes is rotating, centripetal acceleration provide the force for maintaining the rigidity between the nodes and thus maintains the interconnecting tethers or shape-memory booms taught and maintains the nodes in a fixed relationship to each other to provide the desired planar array.

If the ring-like array is non-rotating, such as for the embodiments wherein the shape memory boom is utilized to interconnect the nodes, the forces imposed by the boom may retain to nodes in the desired planar array without rotation as may be desired in particular applications.

If the space object to be imaged is traveling along a known orbit or path in space, the array of the nodes may be positioned at any desired location in the orbit or path of the space object to be imaged and lie in wait for the space object to be imaged to approach and then pass through the imaging area defined by the nodes. In other embodiments of the present invention, the array of nodes of the spacecraft arrangement may be in an intercept mode in which the spacecraft arrangement is moved toward the space object to be imaged either in the same direction as the space object to be imaged is traveling and thus overtake space object to be imaged or move towards the space object to be imaged in a direction opposite to the direction of travel of the space object to be imaged. Thus, the relative movement of the array of nodes of the space vehicle arrangement and the space object to be imaged provides that the space object to be imaged passes through the imaging area defined by the array of nodes. After the space object to be imaged passes through the imaging area the space vehicle arrangement may then be moved to another location to provide viewing of another space object to be imaged.

While it is desired that the planar array of the nodes be perpendicular to the orbit or path of the space object to be imaged, and that the space object to be imaged passes through the array equally distant from each node, there may occur situations in which the array of nodes is skewed in one, two or three dimensions from such a relationship to the space object to be images.

Consequently, while the orbit or path of the space object to be imaged may be accurately known, the relative position of the array of nodes with respect to the space object to be imaged can only be determined by providing passive or active measurements defining the position of each node with respect to the of the space object to be imaged both before imaging and during the imaging as the space object to be imaged passes through the imaging area. and the position of each node with respect to the other nodes in the array.

In one embodiment of the present invention, each of the nodes is provided with the capability of generating a plurality of information signals. A first group of the plurality of information signals is a group of positional information signals and the second group of signals is a group of imaging information signals which provide the image mapping of the space object to be imaged.

The positional information signals have a first portion of information signals defining the position of each node with respect to the space object to be mapped and a second portion of positional information signals defining the position of each node with respect to the other nodes in the array. The positional information signals may be provided both in the time period as the space object to be imaged is approaching the array of nodes, or the array of nodes is approaching the space object to be imaged, and also as the space object to be imaged is passing through the array of nodes and if desired after the space object to be imaged has passed through the imaging area. A clock signal to each of the nodes insures that the positional information signals are synchronized. Thus, each of the positional information signals may be simultaneous or at a know time difference between the positional information signals from each node.

The second group of information signals is the mapping or imaging informational signals. Mapping or imaging informational signals are generated by each node and may include signals from both passive and active sensors and may include photographic signals in the visible, UV or Ir portions of the electromagnetic spectrum, radar signals, mass spectrographic signals, aligned active source signals and aligned signals. Where the sensor is, for example, an active source such as a neutron beam signal, one of the nodes may include the beam transmission portion of the sensor and one of the other nodes, which is aligned with the transmitting node, may include the beam receiving portion of the sensor. The imaging information signal may be generated from the beam receiving portion of the sensor. The mapping or imaging information signals may be generated in the time period of the approach of the space object to be imaged to the spacecraft arrangement, while the space object to be imaged is passing through the imaging area of the spacecraft arrangement or after the space object to be imaged has passed through the imaging area of the spacecraft arrangement.

One or more of the nodes may also include high power arc type lights in any desired electromagnetic frequency range as desired for the particular sensors employed so as. to illuminate the space object to be imaged.

Each of the nodes may also include a solar collection cell array and batteries to be charged by the electricity generated by the solar cell array. Power to each of the nodes may be equalized if desired by interconnecting the nodes through the tether or rigid boom with electrical power transmitting capability so that all nodes have the same level of power available.

In order to provide the desired position of the array of nodes and/or the position of each individual node in the array, each of the nodes may also include a thrust producing mechanism such as one or both of a solid rocket cluster and a cold gas thruster which are activated to allow positioning and orientation of the array of nodes with respect to the space object to be imaged and to each other node. The thrust producing mechanisms may include rotatable nozzles to allow thrust on the node to be applied in any direction or may include multiple thrust producing mechanisms positioned orthoganly.

Also, one or more of the nodes may include a high gain antenna for transmitting the positional signals and the imaging signals to a base or control station or receiving control signals from the base or control station. The base or control station may be located on a satellite in orbit or be a base or control station on the earth or other body in space as appropriate for a given mission. One or more of the nodes may include a star tracker and generate location position signals as a result of the information from the star tracker. The base or control station may receive the star tracker signals and as may be desired cause various control signals to be sent to the nodes.

Depending upon the size of the object to be imaged, the size of the array of nodes may be selected for any desired mission. Thus, for example, the array may include four nodes and the array of the nodes may be in a square pattern with the distance between adjacent nodes sized as required for a particular space object to be imaged. The distance between the nodes on each side of the square array may be selected to be several meters or many kilometers. For example, if the space object to be imaged is a derelict piece of space "junk" such as a derelict booster near earth the distance may be just a few meters. If the space object to be imaged is larger, for example asteroids, inert cometary nuclei or the like, the distance may be increased appropriately. Similarly, if the space object to be imaged is, for example Phobos, one of the moons of Mars, the distance may be increased to many 10s of kilometers.

Each of the nodes may be considered a small satellite or a CubeSat and together the nodes as connected are the spacecraft arrangement of the present invention. Prior to launching into space, the nodes may releasably connected together by locks. The locked together nodes are launched into space by an appropriate launch space vehicle and then separated from the launch vehicle. After such separation, the locks are released upon receipt of a control signal sent, for example, from the base station. One or more of the thrust producing jets on one or more of the nodes, such as rockets or cold gas, are activated to provide the thrust forces to separate the nodes and as required, spin the nodes to a predetermined rotational rate and position the nodes in the desired geometry. The tether or the extendible boom is deployed as the nodes separate to retain the nodes into the desired geometric array.

BRIEF DESCRIPTION OF THE DRAWING

The above and other embodiments of the present invention my be more fully understood from the following detailed description taken together with the accompanying drawing wherein similar reference characters refer to similar elements throughout and in which.

DESCRIPTION OF THE PREFERRED EMBODIMENTS

Figure 1:
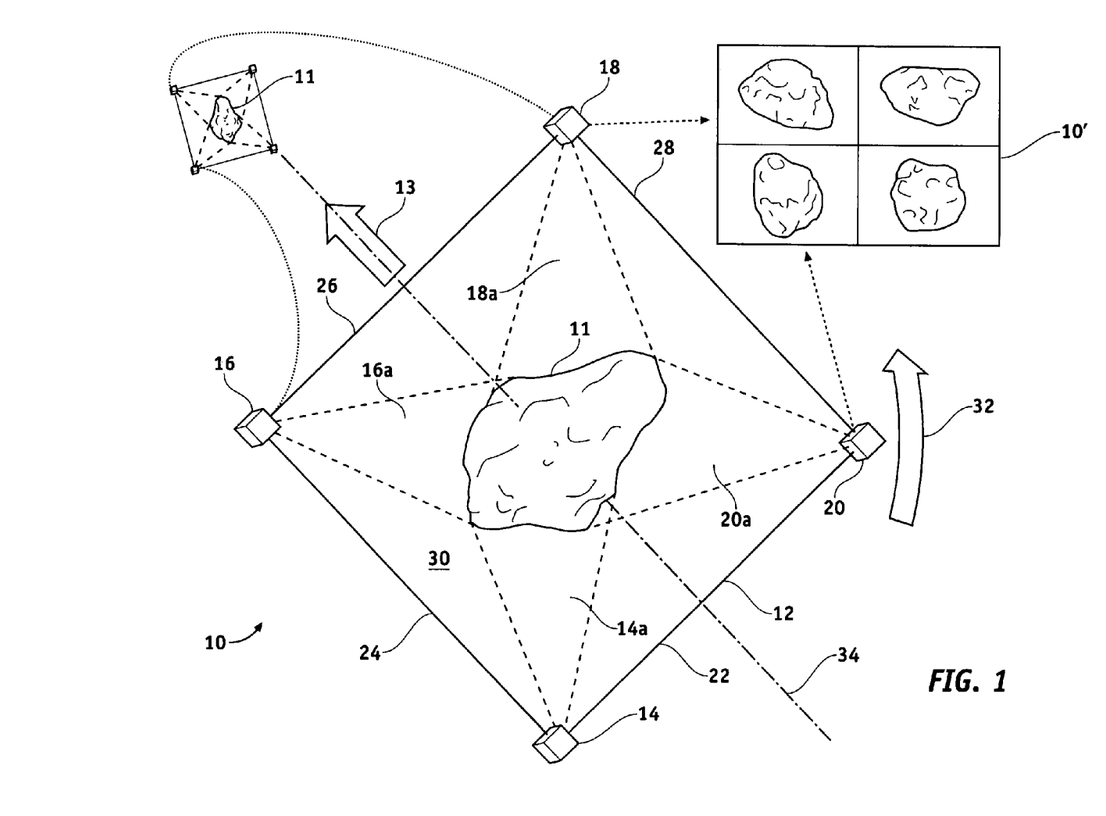
FIG. 1 is a diagrammatic representation of a four node array according to the principles of the present invention for imaging a small asteroid.

Referring now to the drawings, there is shown on FIG. 1 an embodiment 10 of the present invention as deployed in space for imaging a small asteroid 11 and moving towards the asteroid 11 in the direction indicated by the arrow 13.

The embodiment 10 has a spacecraft arrangement 12 comprised of four nodes 14, 16, 18 and 20 connected together by connecting mechanisms 22 connecting noes 14 and 20, connecting mechanism 24 connecting nodes 14 and 16, connecting mechanism 26 connecting nodes 16 and 18 and connecting mechanism 28 connecting nodes 18 20 so that the nodes 14, 16, 18 and 20 are deployed in a planar ring-like geometric configuration providing an open imaging area 30 therebetween. In embodiment 10, the spacecraft arrangement 12 may be rotating in the direction indicated by the arrow 32. The connecting mechanisms 22, 24, 26 and 28 may be, for example, a flexible tether or an extensible boom. If a flexible tether is utilized, centripetal force maintains the tether taught to restrain the nodes in the desired spatial array. The rotation may be about an axis 34 which is perpendicular to the plane of the imaging area 30 and at the center thereof and parallel to the direction of the arrow 13. The asteroid 11 may be moving towards the spacecraft arrangement 12 or away from the spacecraft arrangement 12. If the asteroid 11 is moving away from the spacecraft arrangement 12 and the spacecraft arrangement 12 has a velocity greater than the velocity of the asteroid 11 the spacecraft arrangement 12 is in a tail chase mode. If the asteroid 11 is moving towards the spacecraft arrangement 12 and the spacecraft arrangement 12 is moving towards the asteroid 11 the spacecraft arrangement 12 is in an intercept mode. If the spacecraft arrangement 12 is stationary and the asteroid 11 is moving towards the spacecraft arrangement 12 the spacecraft arrangement 12 is in lying in wait mode.

As described below in connection with FIG. 2A, each of the nodes 14, 16, 18 and 20 are provided with various sensors, active and/or passive, and various signaling generating structures and various signal transmitting structures. As the asteroid 11 passes through the imaging area 30 of the spacecraft arrangement 12 the sensors on the nodes are activated to detect the asteroid 11. One of the sensors on the nodes 14, 16, 18 and 20 may be a photographic sensor for taking a photographic image of the asteroid 11 and transmitting an imaging signal in response to the photographic signals. The nodes 14, 16, 18 and 20 have fields of view 14a, 116a, 18a and 20a, respectively. The sensors on the nodes 14, 16, 18 and 20 are synchronized so that the information signals are taken at the same time or at known time differences. The synchronized photographic information signals from the nodes 14, 16, 18 and 20 are indicated at 10' on FIG. 1.

Figure 2A:
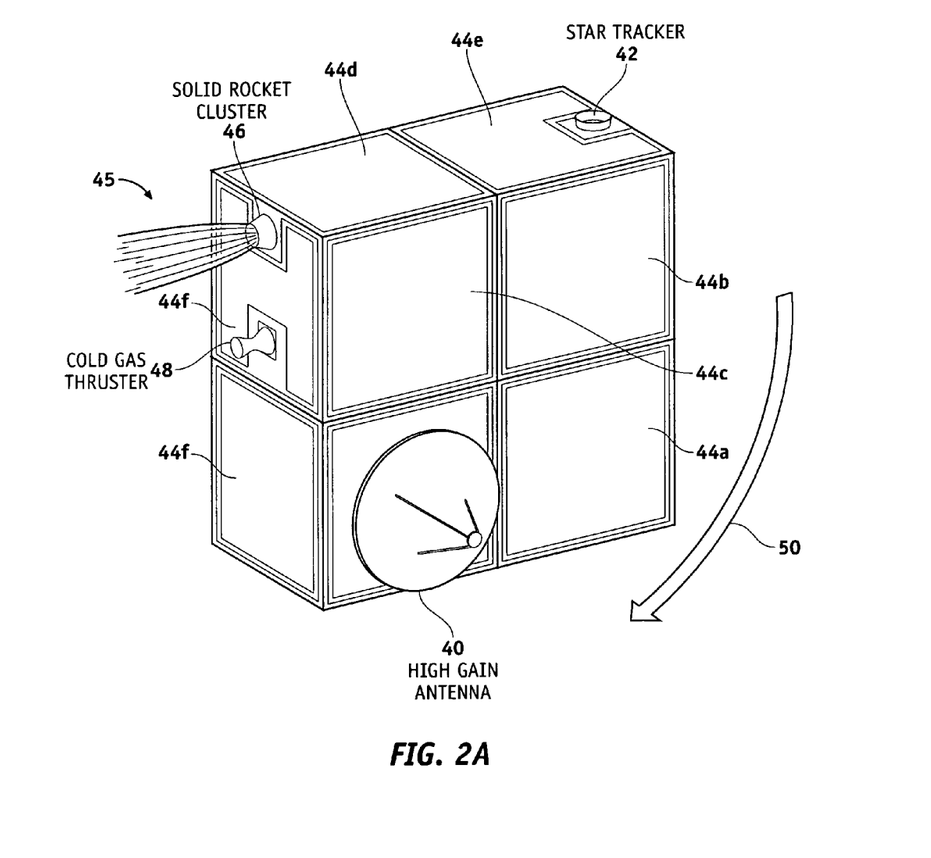
FIG. 2A is diagrammatic representation of a node useful in the practice of the present invention; and, FIG. 2B is diagrammatic representation a four node array of a spacecraft present invention.

Referring now to FIG. 2A there is shown one of the nodes, such as node 14. The node 14 may be provided with a high gain antenna 40 for transmitting and receiving signals from the base or control station. The node 14 may also include a star tracker 42 which provides positional information of the node 14 and consequently the spacecraft arrangement 12 with respect to the position in space. a plurality of solar cell panels such a panels 44a, 44b, 44c 44d, 44e 44f are mounted on the node 14 as well as other solar panels on the other faces of the node 14. The solar panels receive the sunlight and generate electrical energy therefrom for powering the various devices included in the node 14. Thrust producing mechanisms 45 such as a solid rocket cluster 46 and/or a cold gas thruster. The thrust producing mechanisms may incorporate swivel nossels to provide thrust forces to the spacecraft arrangement 12 in any orthogonal direction or, in other embodiments of the present invention, similar thrust producing mechanisms may be incorporated on each of the faces of the node 14. The force provided by the thrust producing mechanisms may provide the force necessary to spin the spacecraft arrangement 12 in the direction of the arrow 50 about the axis 34 and/or move the spacecraft arrangement 12 in any desired direction to provide the alignment desired for the imaging of the space object to be imaged during the approach, flyby or the retreat of the space object to be imaged from the spacecraft arrangement 12. The interior and/or the exterior of the node 14 may contain the various sensors (not shown) as desired for imaging of the space object to be imaged. The nodes 16, 18 and 20 may be identical to node 14 or May, as desired for various applications, differ in the structure and configuration as well as the type of sensors contained and the like.

Figure 2B:
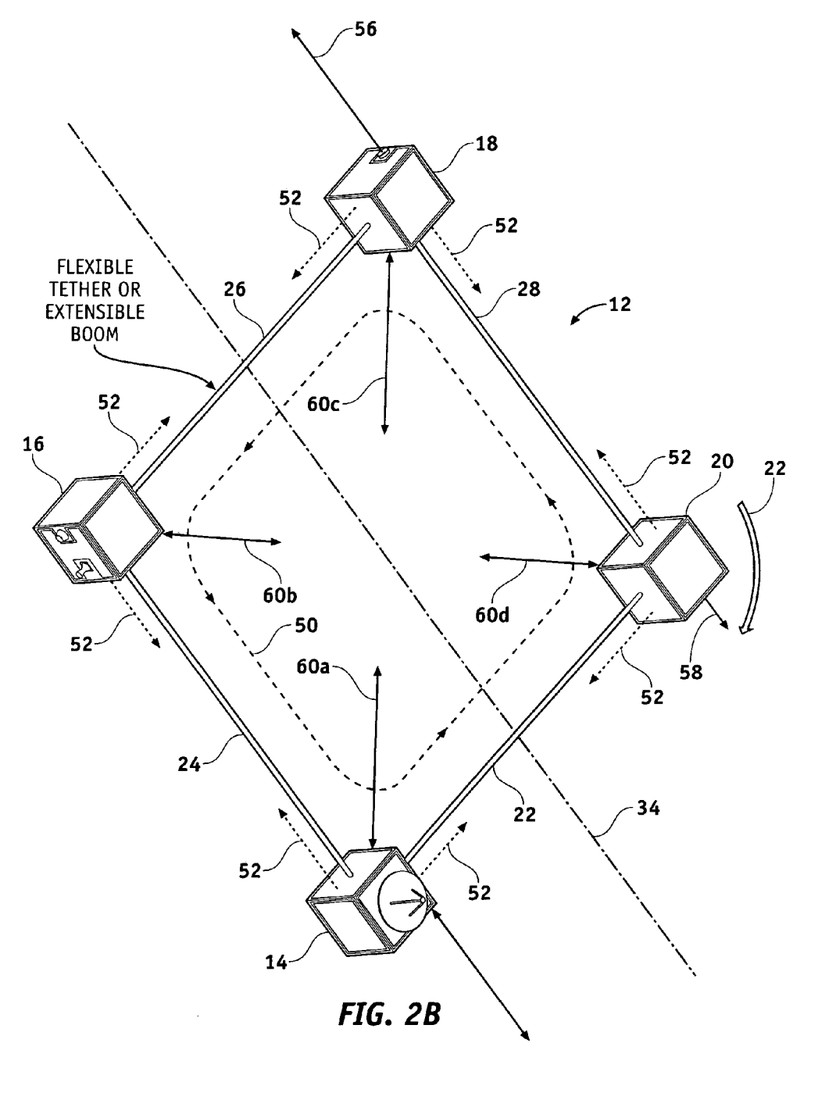

Referring now to FIG. 2B, the space craft 12 is shown with arrows designating the various signals generated and received by the spacecraft arrangement 12. Each of the nodes 14, 16, 18 and 20 may have the structure for transmitting and receiving the various signals. Node 14 may generate a clock signal indicated at 50 that is sent to each of the other nodes 16, 18 and 20 to synchronize the operation of the sensors therein so that the signals from each of the sensors are simultaneous or at know time differences therebetween. Positional information signals for determining the relative position of each node with respect to other nodes are indicated by the dotted arrows 52. Positional information signals such as indicated by the arrow 56 from node 18, and which may also be provided from the other nodes, indicates the position of the spacecraft arrangement 12 with respect to the space object to be imaged during the approach of the spacecraft arrangement 12 to the space object to be imaged. Positional information signals as indicated by the arrow 58 from node 20 and which may also by generated by the other nodes, provides information on the position of the spacecraft 12 with respect to the space object to be imaged during the retreat of the space object to be imaged from the spacecraft arrangement 12. The imaging information signals are indicated by the arrows 60a, 60b, 60c and 60d at the nodes 14, 16, 18 and 20, respectively. these information signals are generated/received by the various sensors in the nodes.

The arrow 70 indicates the transmission of the imaging information signals from the nodes and the receipt of the command signals sent from the base or control station. One or more of the nodes 14, 16, 18 and 29 may have the structure for transmitting the information signals and/or receiving the control signals.

The frequency of the various signals may be selected to be unique so that there is no duplication of the signal frequency.

Figure 3:
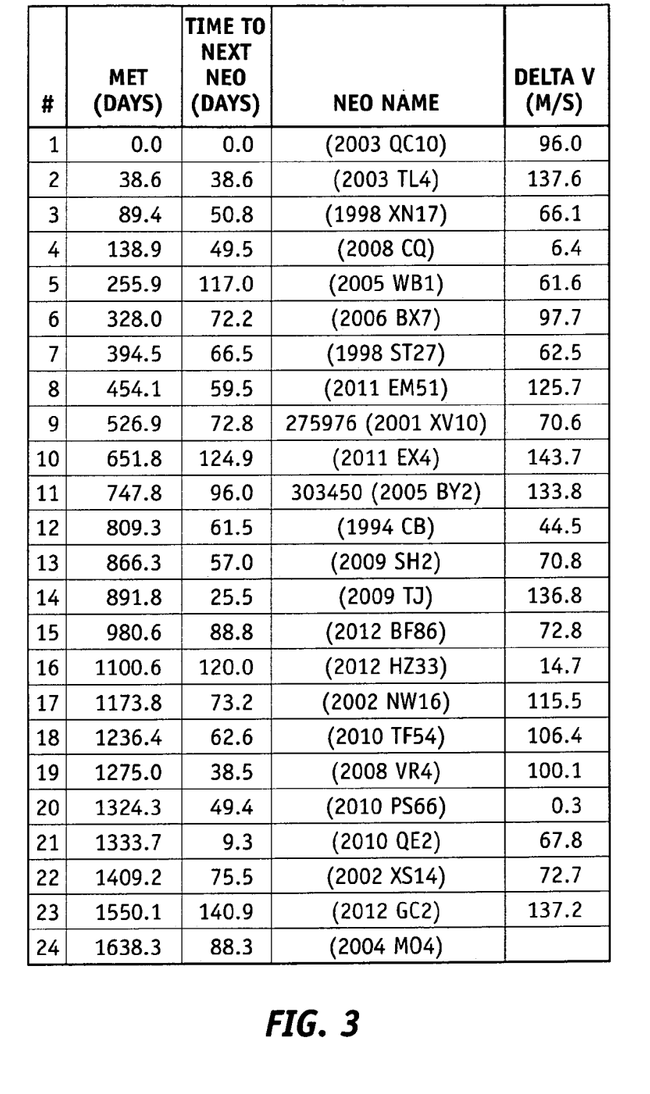
FIG. 3 is a table listing a proposed survey mission of 24 NEOs by a spacecraft arrangement according to the principles of the present invention over a four year period.

FIG. 3 is a table showing a possible mission for the spacecraft arrangement 12 of the present invention. As shown thereon, for a four and one half year mission, the spacecraft arrangement 12 may survey and image 24 near earth orbit ("NEO") space object to be imaged with a net change in delta V of approximately two kilometers per second over the escape velocity required from earth orbit. The space object to be imaged are within plus or minus 0.1 AU of the earth orbit.

Figure 4:
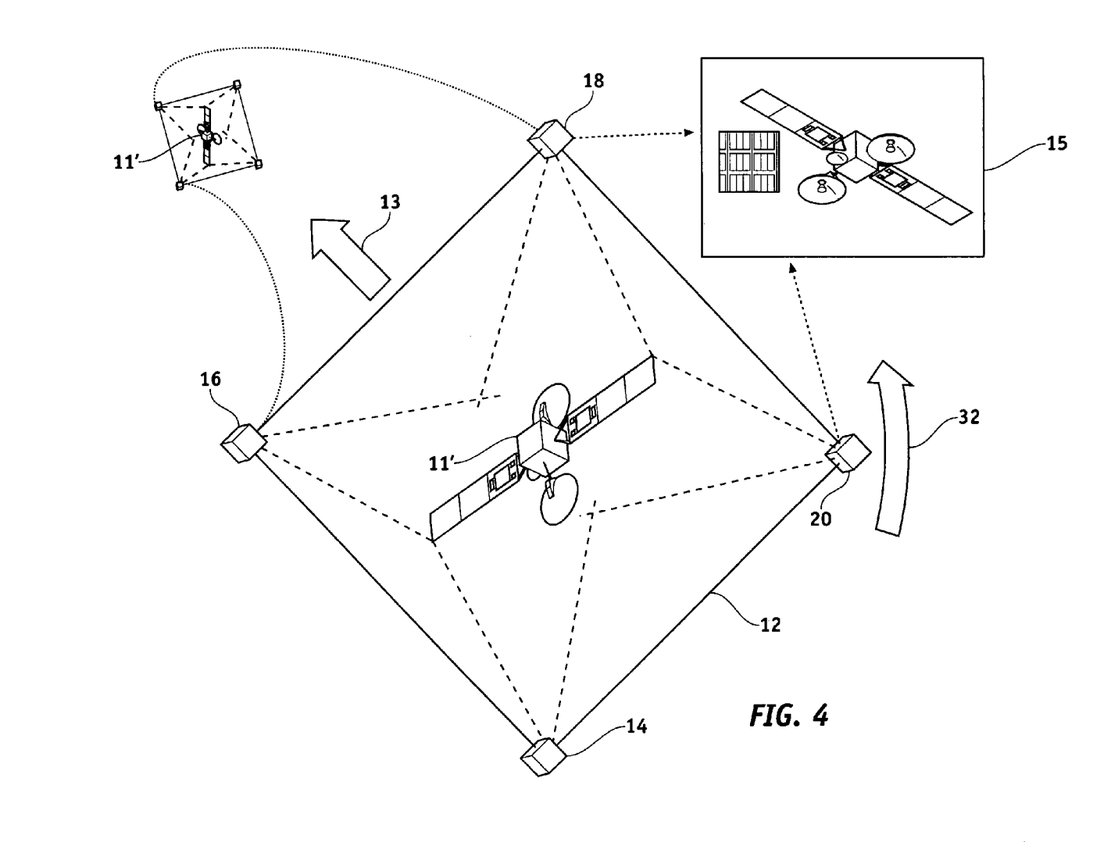
FIG. 4 is a diagrammatic representation of a four node array according to the principles of the present invention for imaging a derelict space vehicle.

Referring now to FIG. 4, there is shown the spacecraft arrangement 12 utilized for imaging a derelict spacecraft and is similar to FIG. 1 and the composite images from the nodes is indicated at 15.

Figure 5:
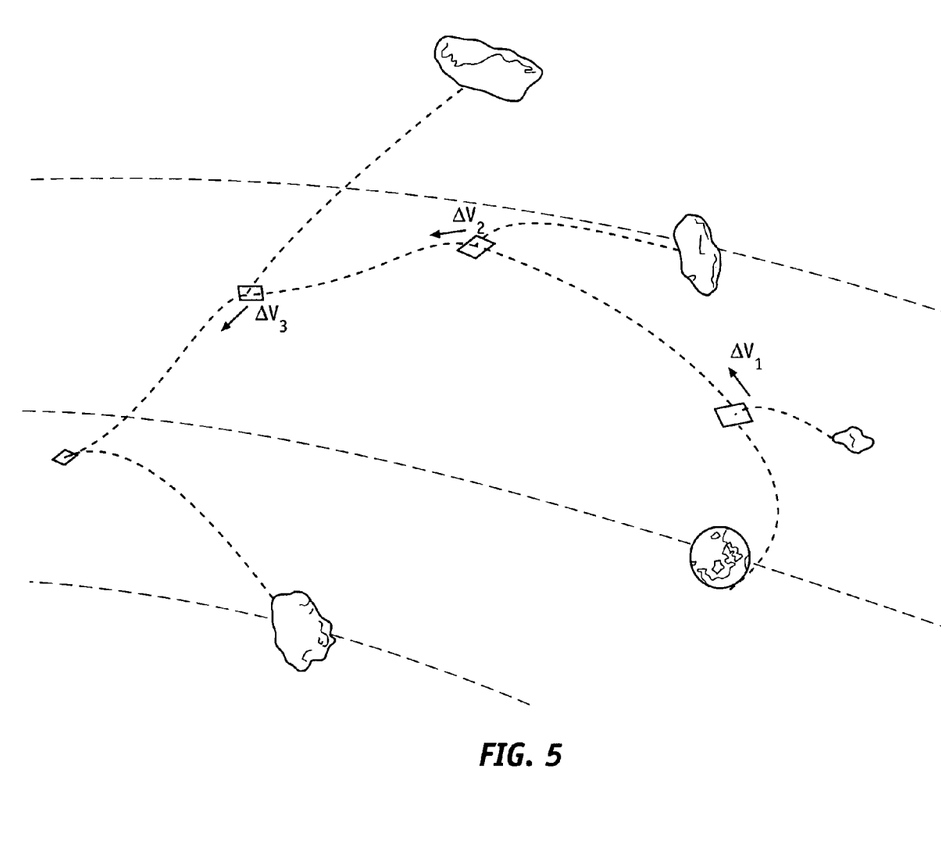
FIG. 5 is diagrammatic representation of a spacecraft according to the principles of the present invention during the sequential imaging of three space objects to be imaged in a single mission; and, FIG. 6 is a composite representation of NEO nodal crossings in the period of Jun. 1, 2013 to Dec. 31, 2017 which are at a distance from earth between 0.9 AU and 1.1 AU in both ascending and descending modes.

FIG. 5 shows a mission profile for a spacecraft arrangement 12 of the present invention to visit and image three separate space object to be imaged after launch from earth and indicates where the delta V must be applied to achieve such imaging.

Figure 6:
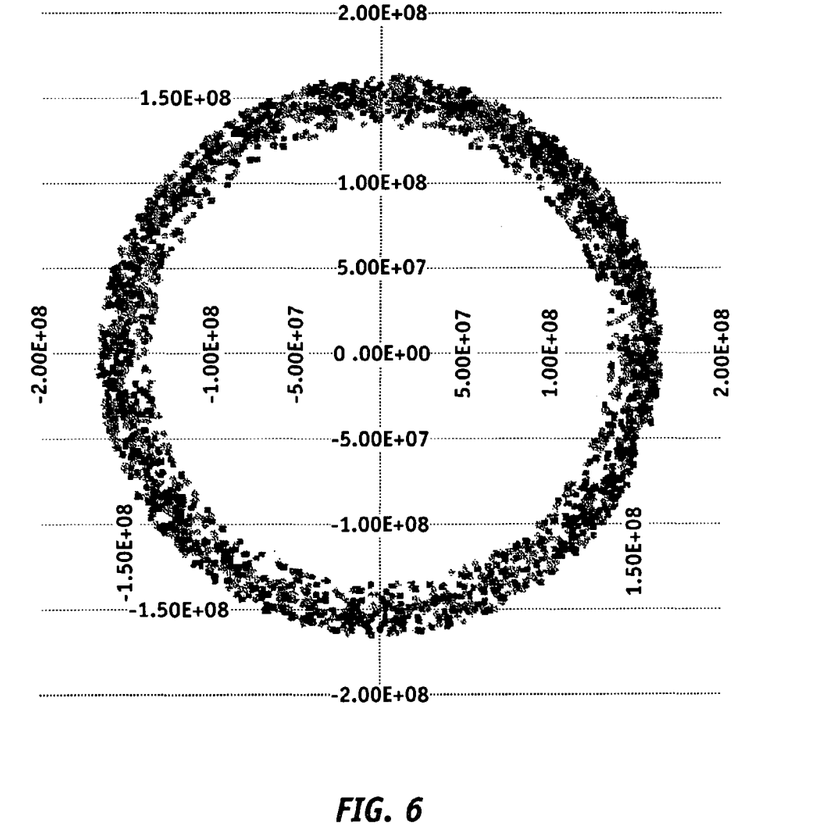

FIG. 6 is a composite representation of NEO nodal crossings in the period of Jun. 1, 2013 to Dec. 31, 2017 which are at a distance from earth between 0.9 AU and 1.1 AU in both ascending and descending modes and, as described below, indicates the large number of space objects to be imaged and which can now, by utilizing the present invention may be selectively and rapidly imaged.

There are many advantage to be gained in utilizing the present invention. Since conventional mapping or imaging of a space object to be imaged requires a single space craft to make multiple passes around the space object to be imaged so as to cover the entire space object to be imaged, much fuel, which must be carried by the spacecraft, is utilized in such maneuvering around the space object to be imaged. The use of so much fuel limits the amount of time available by the spacecraft to perform the imaging. Often, such a spacecraft may only have enough fuel on board to provide imaging of a single space object to be imaged. By utilizing the present invention, the use of fuel is minimized and only a single "pass" or fly by of the space object to be imaged is required for a complete image of the space object to be imaged. Thus, a mission which would rake days or weeks utilizing the convention imaging spacecraft is accomplished in a few minutes or even a few seconds with the single flyby. A minimal amount of fuel is used for each flyby, thereby enabling one array of nodes according to the present invention to make flybys of multiple space objects to be imaged over extended periods of time.

Initial mission analysis has illustrated that the present invention is capable of significantly reducing the time required for any single rendezvous, while enabling an exponential increase in the number of targets surveyed in a given mission timespan for a specific value of delta V. These advances are due to The present invention's unique configuration which enables new methods to dramatically improve the efficiency and timing of each survey mission phase. The nominal survey mission is comprised of three key phases: Approach (trajectory profile to reach target), Rendezvous (maneuvers to match target velocity) and Proximity operations (relative motion about target to perform inspection mission). This process is repeated until the fuel is depleted or the mission life has been exceeded.

The first mission improvement the present invention's configuration provides over current methods is the ability to dramatically reduce the time necessary to perform the inspection mission. Proximity operations is challenging, and the longer the vehicle remains in orbit about the target the greater the chance for an anomaly to occur and end the mission. NEAR and DAWN mission configurations both required weeks to map their respective targets. Additionally, with the prior art involving a single vehicle in orbit about, for example, a near earth asteroid there will be natural and re-occurring communication outages when the target occults the line of sight back to Earth requiring both planning and contingencies to account for the loss of telemetry and commanding. As illustrated in FIG. 4, the present invention overcomes each of these challenges. First, since the ring encircles the target, the entire target is imaged tomographically in minutes as opposed to days due to the ring's spin rate coupled with the target's natural rotational rate. The ring's rotational rate, alignment and potential orientation-rate (torques on the ring's angular momentum vector) will be determined upon approach to minimize the time to inspect the entire target. With the present invention's distributed architecture at least one node will always have an orientations while surveying the target providing line of sight to Earth for communications with a base station located on Earth as well as always having line of site with one or more of the nodes and maintaining line of sight to the sun for power generation.

The ability to decrease the time required to be in proximity to a space object to be imaged is a unique aspect of the present invention and results in a reduction in total delta V for a survey. However, applying traditional survey profiles to this vehicle does not fully exploit its revolutionary capabilities. To fully utilize the present invention's configuration, distinct CO-NOPS must be employed leveraging the oldest and most traditional of all survey methods: the flyby. From Mariner to Voyager through to Cassini and New Horizons, most surveys have been flybys of target bodies to minimize the total delta V required for the mission while maximizing the number of targets that can be visited over the mission lifetime. The present invention is still limited by this fundamental constraint, but unlike previous or future flyby survey missions utilizing the prior art surveying spacecraft techniques, the present invention is able to survey the entire target formation as collected by weeks of proximity operations.

The mission improvement utilizing the present invention also represents a transformational survey capability made possible only by the present invention. By fully exploiting the present invention's unique configuration, hundreds of survey targets can be visited for the same delta V required to visit a single survey target using prior art survey space vehicle methods. The present invention enables a "Grand Tour" either near earth asteroids or derelict super-synchronous space vehicles by encountering each target at its nodal crossing, as illustrated in FIG. 5. Whether the target is at its ascending or descending node does not matter since it is fixed in inertial space at a unique time. By remaining in the ecliptic or equatorial plane with a natural relative motion to the set of nodal crossing points, the approach and rendezvous problem is dramatically simplified and mission planning degenerates to a simple Lambert problem requiring the present invention to be at the right place at the right time to allow' the tomographic collection to occur as the target flies through the ring formed by the present invention. The delta V required to execute this "2D traveling salesman problem" is relegated to nominal deep space maneuvers ("DSM") to correct the trajectory and ensure proper phasing with the target as opposed to large maneuvers to match the target's plane or velocity. FIG. 6 shows the 8427 nodal crossings of the 7224 NEOs in the NASA NED Program Near-Earth Object Human Space Flight Accessible Targets Study ("NHATS") database over a five year window within plus or minus 0.1 AU of the Earth's orbit. From this set of crossings, an unoptimized version of a mission utilizing the present invention was shown to be capable of a mission that enabled nearly 30 targets to be surveyed for a total Grand Tour delta V of 2 km/s over the escape velocity required from Earth orbit. As noted above, the table of FIG. 3 details the resulting ecliptic encounters with each NEO over the 4½ year mission.

Since 1985, 21 NEOs (13 asteroids and 8 comets) have been surveyed by 15 spacecraft. As shown in Table 4, a single unoptimized mission utilizing the present invention is capable of encountering more NEOs in less than 5 years than all of the missions' combined over the past 28 years for a total delta V equivalent to the NEAR Shoemaker, Hayabusa and ROSETTA missions. With an optimized trajectory utilizing the present invention, 100s of NEOs could be cataloged and characterized over the same mission duration. This order of magnitude increase in the knowledge of NEO bodies provides the critical information required to rapidly and accurately assess targets for the proposed asteroid retrieval mission. By providing fundamental details of mass, dimension, composition and structure about each candidate NED, the time critical information necessary to influence designs and mission plans, decrease program risk and assure mission success will be available. Additionally, the present invention spacecraft arrangement vehicle itself represents an improved spacecraft design by integrating advanced technologies into one multifunctional structure.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. A spacecraft arrangement comprising, in combination:
    a plurality of spaced apart nodes defining a preselected geometrical configuration, each node of the plurality of nodes connected to adjacent nodes of the plurality of nodes, and said plurality of nodes defining an open imaging area therebetween;
    a connecting member for providing said connection between adjacent nodes;
    at least one of said nodes having positional information signal generating, transmitting and receiving structures thereon;
    at least one of said nodes having sensors thereon for generating and transmitting imaging information signals;
    at least one of said nodes having a command signal receiving structure thereon; and,
    at least one of said nodes having thrust producing structures thereon,
    whereby said imaging information signals are generated and transmitted
    for a condition of a space object to be imaged passing through said open imaging area.

2. The arrangement defined in claim 1 and further comprising:
    at least one of said nodes having a clock signal generator and clock signal transmitter for transmitting a clock signal to each of the other nodes.

3. The arrangement defined in claim 1 and further comprising:
    at least one of said nodes having a thrust producing generator therein.

4. The arrangement defined in claim 3 and further comprising:
    each of said nodes has said thrust producing generator therein.

5. The arrangement defined in claim 4 wherein:
    said thrust producing generators in each of said nodes producing thrust in three orthogonal directions.

6. The arrangement defined in claim 4 and further comprising:
    said thrust producing generator on each of said nodes is swivel mounted for selective positioning in each of three orthogonal directions.

7. The arrangement defying in claim 3 and further comprising:
    said thrust producing generator producing thrust in three orthogonal directions.

8. The arrangement defined in claim 1 wherein:
    said connecting member for connecting together said spaced apart nodes is a flexible strap.

9. The arrangement defined in claim 1 wherein:
    said connecting member for connecting together said spaced apart nodes is an extendable boom.

10. The arrangement defined in claim 1 and further comprising:
    at least one of said nodes having a star tracker thereon.

11. The arrangement defined in claim 1 and further comprising:
    each of said nodes has a solar panel array for receiving solar light and generating electrical power in response thereto.

12. The arrangement defined in claim 1 further comprising:
    each of said nodes having positional information signal generating, transmitting and receiving structures therein.

13. The arrangement defined in claim 1 wherein:
    each of said nodes has a plurality of sensors thereon selected from the group consisting of active and passive sensors.

14. The arrangement defined in claim 1 wherein:
    when said imaging information signals are generated by multiple of said nodes, a signal frequency of the imaging information signals generated by each node is a different frequency than the signals generated by each other node.

15. The arrangement defined in claim 1 and further comprising:
    at least one of said nodes having a clock signal generator and clock signal transmitter for transmitting a clock signal to each of the other of said nodes;
    each of said nodes having a swivel mounted thrust producing generator mounted thereon;
    said connecting member for connecting together said adjacent nodes is selected from the group consisting of a flexible strap and an extendable boom;
    more than one of said nodes has a star tracker mounted thereon;
    each of said nodes has a solar panel array mounted thereon for receiving solar light and generating electrical power in response thereto;
    each of said nodes having positional information and generating, transmitting and receiving structures thereon;
    each of said nodes having a plurality of sensors thereon selected from the group consisting of active and passive sensors.

* * * * *